US009625895B2

(12) United States Patent
Sinreich (10) Patent No.: US 9,625,895 B2
(45) Date of Patent: Apr. 18, 2017

(54) REGULATING POWER FOR A WIRELESS COMMUNICATION DEVICE

(75) Inventor: Mark Sinreich, Twinsburg, OH (US)

(73) Assignee: PEPPERL+FUCHS GMBH, Mannheim (DE)

( * ) Notice: Subject to any disclaimer, the term of this patent is extended or adjusted under 35 U.S.C. 154(b) by 770 days.

(21) Appl. No.: 13/601,044

(22) Filed: Aug. 31, 2012

(65) Prior Publication Data

US 2012/0326525 A1 Dec. 27, 2012

Related U.S. Application Data

(63) Continuation of application No. 12/147,469, filed on Jun. 26, 2008, now Pat. No. 8,258,749.

(60) Provisional application No. 60/937,396, filed on Jun. 26, 2007, provisional application No. 60/937,397, filed on Jun. 26, 2007, provisional application No. 61/012,262, filed on Dec. 7, 2007.

(51) Int. Cl.
 *G05B 19/042* (2006.01)
(52) U.S. Cl.
 CPC ............... *G05B 19/0423* (2013.01); *G05B 2219/25006* (2013.01); *G05B 2219/25359* (2013.01); *G05B 2219/25361* (2013.01); *G05B 2219/25428* (2013.01); *G05B 2219/33192* (2013.01); *G05B 2219/34313* (2013.01)
(58) Field of Classification Search
 CPC ....................................................... Y02E 60/12
 USPC ........................................................ 320/128
 See application file for complete search history.

(56) References Cited

U.S. PATENT DOCUMENTS

| 5,959,372 A | * | 9/1999 | Every | G08C 19/02 |
|---|---|---|---|---|
| | | | | 307/131 |
| 5,977,749 A | * | 11/1999 | Kim | ............................. 320/128 |
| 6,304,978 B1 | * | 10/2001 | Horigan et al. | ............... 713/322 |
| 6,677,824 B2 | | 1/2004 | Harpham | |
| 7,593,642 B2 | | 9/2009 | Loechner | |
| 8,280,317 B2 | | 10/2012 | Sinreich | |
| 2001/0017572 A1 | * | 8/2001 | Harpham | ........................ 331/14 |
| 2002/0198648 A1 | * | 12/2002 | Gilbreth et al. | ............... 701/100 |

(Continued)

FOREIGN PATENT DOCUMENTS

WO 2006/025918 A2 3/2006

OTHER PUBLICATIONS

Blaine R. Copenheaver, International Search Report, Mailed Sep. 3, 2008, International Application No. PCT/US2008/068444.

(Continued)

*Primary Examiner* — Samuel Berhanu
*Assistant Examiner* — Tessema Kebede
(74) *Attorney, Agent, or Firm* — Thompson Hine LLP (57) ABSTRACT

A method is provided for managing power for a wireless communication device. The method includes receiving a loop current at an insertion voltage at an initial input, the loop current being generated by a power supply. The method further includes comparing a reference voltage to the insertion voltage and generating a feedback signal based at least upon the comparison of the reference voltage to the insertion voltage. The method still further includes regulating the insertion voltage based at least upon the feedback signal, delivering charging power to an electrical storage element, wherein the charging power is a function of the insertion voltage and the loop current, and storing the charging power in the electrical storage element.

15 Claims, 3 Drawing Sheets

(56) References Cited

U.S. PATENT DOCUMENTS

| | | | |
|---|---|---|---|
| 2003/0075993 A1* | 4/2003 | Fadell | G06F 1/266 307/150 |
| 2004/0158334 A1 | 8/2004 | Kirkpatrick et al. | |
| 2005/0245291 A1* | 11/2005 | Brown et al. | 455/572 |
| 2005/0289276 A1* | 12/2005 | Karschnia et al. | 710/305 |
| 2006/0092039 A1 | 5/2006 | Saito et al. | |
| 2007/0063833 A1 | 3/2007 | Kates | |
| 2010/0061733 A1 | 3/2010 | Loechner | |
| 2013/0029533 A1 | 1/2013 | Sinreich | |

OTHER PUBLICATIONS

EP Application No. 08772093.4, Examination Report, 6 pages, Apr. 14, 2016.

EP Application No. 08772093.4, Search Report and Opinion, 9 pages, Mar. 7, 2014.

International Application No. PCT/US2008/068440, International Search Report, 1 page, Sep. 5, 2008.

International Application No. PCT/US2008/068440, Written Opinion of the International Searching Authority, 4 pages, Sep. 5, 2008.

U.S. Appl. No. 12/147,454, Non-Final Office Action, 8 pages, Nov. 21, 2011.

U.S. Appl. No. 12/147,454, Notice of Allowance, 7 pages, Jun. 4, 2012.

U.S. Appl. No. 12/147,469, Non-Final Office Action, 8 pages, Oct. 11, 2011.

U.S. Appl. No. 12/147,469, Notice of Allowance, 5 pages, May 2, 2012.

U.S. Appl. No. 13/632,279, Non-Final Office Action, 5 pages, Sep. 11, 2014.

U.S. Appl. No. 13/632,279, Notice of Allowance, 5 pages, Feb. 26, 2015.

\* cited by examiner

REGULATING POWER FOR A WIRELESS COMMUNICATION DEVICE

REFERENCE TO RELATED APPLICATIONS

This application is a continuation of U.S. patent application Ser. No. 12/147,469, entitled "Power Regulator For Use With Wireless Communication Device," filed Jun. 26, 2008, now U.S. Pat. No. 8,258,749 which claims the benefit of U.S. Provisional Application Ser. No. 60/937,396, filed Jun. 26, 2007, U.S. Provisional Application Ser. No. 60/937,397, filed Jun. 26, 2007, and U.S. Provisional Application Ser. No. 61/012,262, filed Dec. 7, 2007, the substance of which is incorporated herein by reference for the entire disclosures of these prior applications.

TECHNICAL FIELD

The systems and methods relate generally to the field of process control systems. More specifically, the disclosed systems and methods relate to field devices powered at least partly by process control loops.

BACKGROUND

Conventional process control systems generally include basic components for sensing, measuring, evaluating, and adjusting or otherwise controlling a variety of process variables. Additionally, common systems include components that provide means for communicating information about process control variables between sensing, measuring, or adjusting components and evaluation components. One such system for communicating information is a two-wire system that creates a loop that physically connects a sensing, measuring, evaluating, or adjusting device to a controller.

Sensing, measuring, evaluating, and/or adjusting devices in industrial production environments are generally referred to as field devices. Field devices commonly sense or monitor one or more process control variables such as temperature, pressure, or rate of fluid flow, among others. Many of these field devices can communicate information about the sensed or monitored variable to a process controller by regulating electrical current on the two-wire system. The controller in this type of environment can sense the electrical current, such as by using a current sense resistor, and translate the sensed magnitude of the current, as well as any sensed change of the current, into information about the sensed or monitored control variable. Many common field devices can receive information from the controller and effect changes or adjustments to the sensed or monitored control.

Two methods of communicating information using a multi-wire loop system include analog signaling methods, such as communicating information via an analog current signal, and digital signaling methods that can communicate information as a frequency shift keyed carrier signal which can be superimposed on, and coexist with, an analog signaling method on the multi-wire loop. One digital signaling method is the Highway Addressable Remote Transducer ("HART") communications protocol from the HART® Communication Foundation. As referred to herein, HART refers to any past or present version of the HART protocol, including Wireless HART, variants of such versions, as well as any future version that may be created so long as those future versions are compatible or can be modified to be compatible with the systems and methods disclosed herein.

SUMMARY

According to one embodiment, a power management circuit can comprise a power regulator and a wireless communication device. The power regulator is configured to maintain a voltage level at an input and includes an input and an output. The input is configured to receive a current signal communicated between a power supply and a field device. The output is configured to deliver charging power. The wireless communication device is in electrical communication with the power regulator and is configured to receive the charging power to power the wireless communication device. The charging power is generated from the voltage level at the input and the current signal. The charging power also changes in response to a change in the current signal.

A process control system comprises a field device, a power supply, and a power management circuit. The power supply is in electrical communication with the field device. The power supply is configured to transmit a current signal to the field device. The field device is configured to regulate the current signal. The power management circuit is in electrical communication with each of the field device and the power supply. The power management circuit comprises a power regulator and a wireless communication device. The power regulator is configured to maintain a voltage level at an input. The power regulator includes an input and an output. The input is configured to receive the current signal. The output is configured to deliver charging power. The wireless communication device is in electrical communication with the power regulator and is configured to receive the charging power to power the wireless communication device. The charging power is generated from the voltage level at the input and the current signal. The charging power changes in response to a change in the current signal.

A method for managing power for a wireless communication device comprises receiving a current signal at an input, the current signal being transmitted between a power supply and a field device. The method further comprises regulating a voltage level at the input and generating charging power from the voltage level at the input and the current signal, wherein the charging power changes in response to a change in the current signal. The method yet further comprises delivering the charging power to an electrical storage device and delivering the charging power from the electrical storage device to a wireless communication device.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Most components and methods disclosed are described with reference to the drawings. In drawings, like reference numbers are used to refer to like elements throughout the drawings. In the following description, to aid in explanation, a number of specific details are provided to promote understanding of the disclosed subject matter. It may be evident, however, that certain of these specific details can be omitted or combined with others in a specific implementation. In other instances, certain structures and devices are shown in block diagram form in order to facilitate description. Further, it should be noted that although specific examples presented can include or reference specific components, a specific implementation of the components and methods disclosed and described is not necessarily limited to those specific examples and can be employed in other contexts as well. Those of ordinary skill in the art will readily recognize that the disclosed and described components and methods can be used to create other components and execute other methods in a wide variety of ways.

Figure 1:
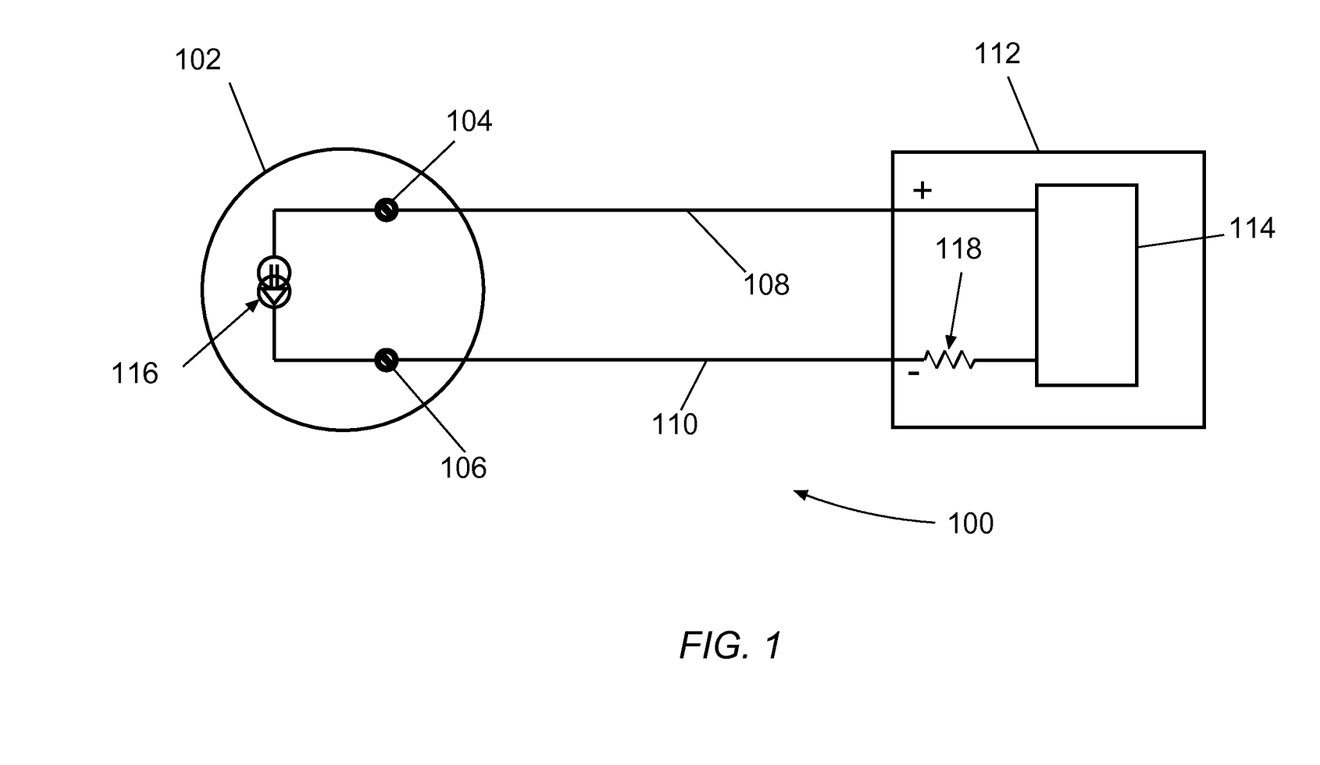
FIG. 1 is a system block diagram of a process control loop.

FIG. 1 is a system block diagram of a process control system 100. As illustrated, a field device 102 can include connection terminals 104, 106 to which control loop wires 108, 110 can be connected. A controller 112 can include a power supply 114 that is operable to supply electrical current (e.g., loop current) and voltage to the control loop wires 108, 110. In particular, a positive terminal of the power supply 114 can be in electrical communication with the control loop wire 108 and a negative terminal of the power supply 114 can be in electrical communication with the control loop wire 110. In one embodiment, the power supply 114 can produce loop current magnitudes levels from approximately 3.5 mA to approximately 20 mA during normal operation, with maximum current values as high as approximately 130 mA during maximum fault conditions. However, any of a variety of other current or voltage ranges may be provided by the power supply, such as may correspond with voltage and current parameters for a particular field device, for example.

In one embodiment, as illustrated in FIG. 1, the field device 102 can include a current regulator 116 that is operable to change amounts of loop current provided through the control loop wires 108, 110. Using the current regulator 116, the field device 102 can regulate the amounts of electrical current to communicate a control process variable to the controller 112. For example, if the field device 102 is configured to sense temperature, the current regulator 116 can regulate the amounts of current provided through the control loop wires 108, 110 to indicate the monitored temperature. It will be appreciated that any of a variety of suitable alternative embodiments can indicate a control process variable in the field device such as, for example, a current shunt, a voltage shunt, or the like.

In order to communicate the amount of current to the controller 112, in one embodiment, the controller 112 can include a current sense resistor 118 which can operate to sense the loop current provided through the control loop wires 108, 110. However, it will be appreciated that the controller 112 can sense loop current or other variables in any of a variety of suitable alternative configurations. Additionally or alternatively, the process control system 100 can include digital signaling components (not shown) to facilitate the communication of information as a carrier signal on the control loop wires 108, 110. In one embodiment, the field device 102 can include Highway Addressable Remote Transducer ("HART") communication components, such as wireless HART communication components. However, the process control system can include components for any of a variety of suitable alternative communication protocols such as, for example, ISA SP100 and Fieldbus among others.

Figure 2:
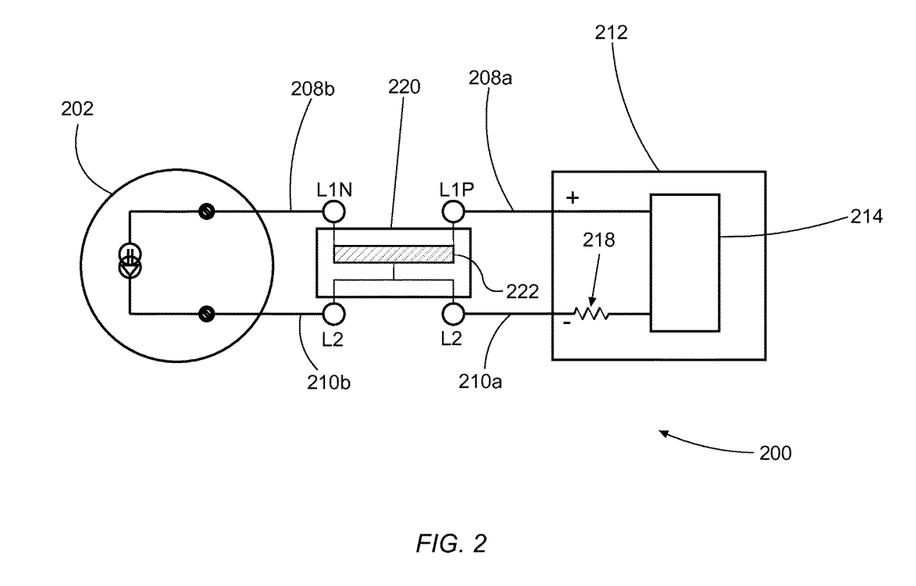
FIG. 2 is a system block diagram of a process control loop.

It will be appreciated that the process control system 100 can communicate with an associated network to provide information to a host controller. Conventionally, the controller 112 communicates with the associated network via wired communication. However, in some embodiments, the controller 112 may not support wired communication with the network (e.g., when digital signaling equipment is not present on the controller 112 or during failure of digital certain signaling equipment). Therefore, in one embodiment, as illustrated in FIG. 2, a wireless adapter device 220 can be included. As will be described in more detail below, the wireless adapter device 220 can include components and circuitry that are configured to provide wireless radio frequency ("RF") communications with an RF-based network in a facility that can communicate with a controller 212 or other suitable controllers. The wireless adapter device 220 can function as a gateway between components that can provide digital signaling for a field device 202 and a wireless communication network (not shown) in a facility. The controller 212 can be the controller 112 of FIG. 1 or as another suitable controller. The field device 202 can be the field device 102 depicted and described in FIG. 1 or can be another suitable field device.

Conventionally, the wireless adapter device 220 can be powered by dedicated power sources such as, for example, a separate wired power circuit, a battery, or a solar power cell, among others. However, installation and maintenance of a wireless adapter device powered by these dedicated power sources can be costly and time consuming. Therefore, as illustrated in FIG. 2, the wireless adapter device 220 can provided in electrical communication with the control loop wires 208a, 208b, 210a, 210b such that the wireless adapter device 220 can be powered from loop current through the control loop wires 208a, 208b, 210a, 210b. In such an embodiment, the wireless adapter device 220 can include a power management circuit 222 provided between nodes L1P and L1N which can be connected in series with the control loop wires 208a and 208b. As described in more detail below, insertion power can be provided to the power management circuit 222 to power the wireless adapter device 220 without substantially interfering with the loop current. Accordingly, the wireless adapter device 220 can be powered by the process control system 200 without hindering the field device 202 from communicating a control process variable to the controller 212 (e.g., via current on loop wires 208a, 208b, 210a, 210b).

Figure 3:
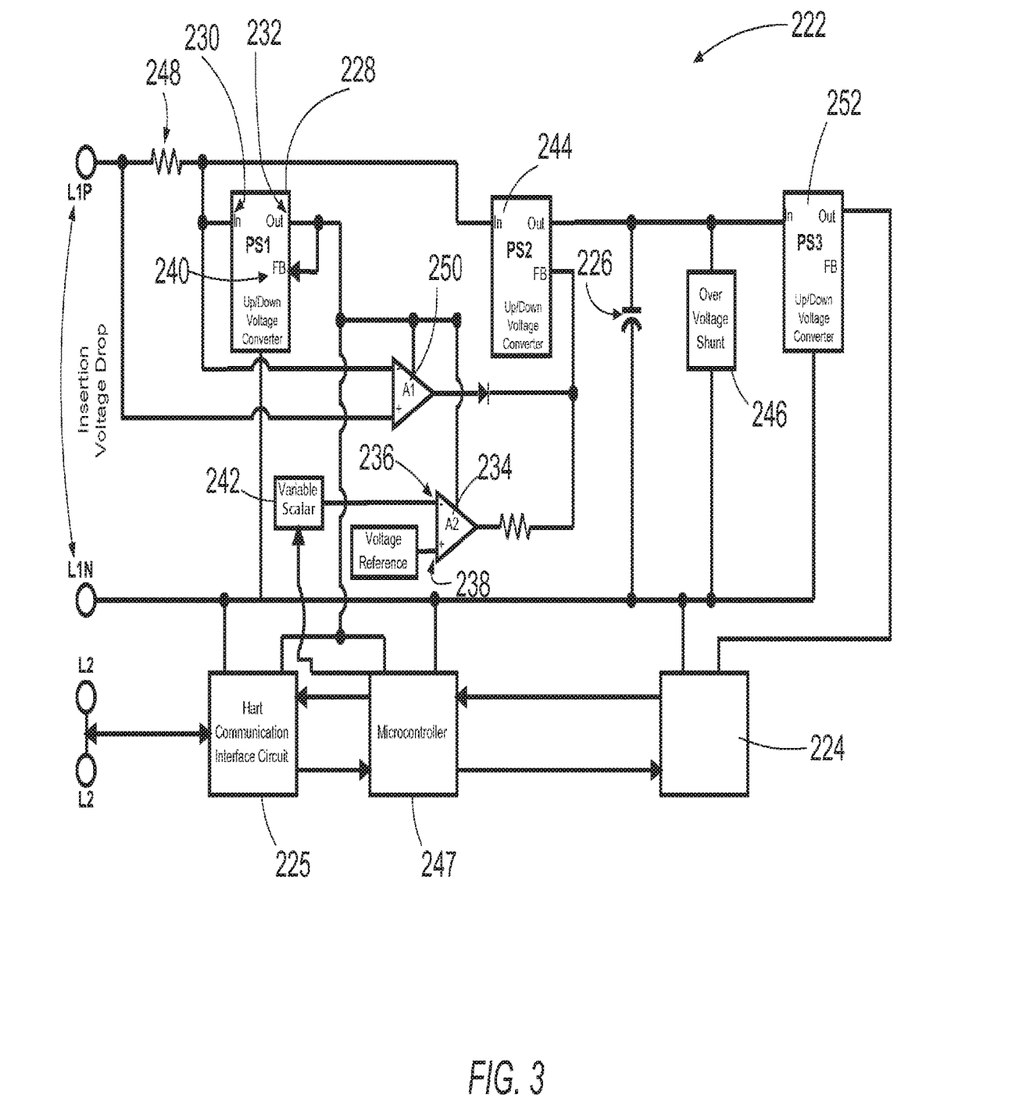
FIG. 3 is a system block diagram of a power management circuit.

FIG. 3 is a system block diagram of one embodiment of the power management circuit 222. It will be appreciated that, the power management circuit 222 can be used in any of a variety of process control systems such as illustrated in FIGS. 1 and 2, among other systems. The power management circuit 222 can be electrically connected between nodes L1P and L1N to facilitate the flow of loop current through the power management circuit 222 when the nodes L1P and L1N are connected in series with the loop wires 208a and 208b. The flow of loop current through the power management circuit 222 and can induce an insertion voltage across nodes L1P and L1N. Conventionally, this insertion voltage is insufficient to power the wireless adapter device 220. Therefore, the power management circuit 222 can include a voltage converter 228 connected to the insertion voltage at an input 230. An output 232 of the voltage converter 228 can be connected with certain electronic components of the wireless adapter device 220 such as an amplifier 234, a current loop amplifier 250, a HART interface logic device 225, and a microcontroller 247. The voltage converter 228 can convert the insertion voltage to an appropriate source voltage for powering each of the electronic components of the wireless adapter device 220.

The power management circuit 222 can include a wireless communication device 224. The wireless communication device 224 can be configured to provide wireless RF communications to transmit information (e.g., process variable information) between the wireless adapter device 220 and an RF based network in a facility. In certain embodiments, the wireless communication device 224 can include a transceiver that is supportive of any of a variety of wireless platforms such as IEEE 802.11, Bluetooth, microwave, infrared, or the like. In addition, the power management circuit can further include HART interface logic 225 associated with the wireless communication device 224 to facilitate communication according to a HART protocol.

It will be appreciated that the power available from the loop current (e.g., insertion power) to power the wireless communication device 224 is generally the multiplicative product of the loop current and the insertion voltage. Typically, the wireless communication device 224 consumes more instantaneous power than is available as insertion power. The power management circuit 222 can include an electrical storage element device 226 that is configured to store insertion power and deliver the stored insertion power to the wireless communication device 224 as needed. Although the electrical storage device 226 is illustrated in FIG. 3 to comprise a supercapacitor, it will be appreciated that, any of a variety of alternative suitable electrical storage devices can be provided such as a general purpose energy storage capacitor or a battery, for example.

The electrical storage device 226 can be charged by a second voltage converter 244. As illustrated in FIG. 3, the electrical storage device 226 can be in electrical communication with output OUT of the second voltage converter 244. The second voltage converter 244 can transfer substantially all of the insertion power available, less the power consumed by the first voltage regulator 232, to charge the electrical storage device 226. Electrical energy can be provided from the electrical storage device 226 to meet the instantaneous and long term power requirements of the wireless communication device 224.

It will be appreciated that the storage capacity of the electrical storage device 226 can be many times greater than the insertion power such that charging of the electrical storage device 226 can take a relatively long period of time (potentially ranging from about one minute to a few hours). When the power from the electrical storage device 226 becomes depleted, the voltage (e.g., radio voltage) of the electrical storage device 226 can also become depleted. To optimize the delivery of the power from the electrical storage device 226 at a substantially constant voltage, the power management circuit 222 can include a third voltage converter 252 that is in electrical communication with each of the electrical storage device 226 and the wireless communication device 224. The third voltage converter 252 can generate a constant regulated radio voltage regardless of whether the electrical storage device 226 is charged to maximum capacity or is nearly depleted.

Conventionally, the insertion voltage has been regulated to a desired setpoint with a current shunt provided in parallel with the power management circuit 222. In such an arrangement, loop current is divided between the power management circuit and the current shunt (e.g., a current divider circuit). If the loop current changes (e.g., due to a changing process variable), the current through the current shunt correspondingly changes to maintain the balance between the current shunt and the power management circuit thereby maintaining a constant insertion voltage drop. It will be appreciated however that any current that flows through the current shunt is not available to power the wireless adapter device and is wasted.

The second voltage converter 244 can be configured to regulate the insertion voltage without the need for a conventional-type current shunt. In some conventional configurations, voltage converters maintain a consistent voltage level at their output by varying the power transferred from their input. Generally, this conventional voltage regulator configuration is suitable where there is ample power provided at the input (e.g., to satisfy the power demands of a circuit electrically connected to the output of the voltage regulator). However, when the current and power provided at the input (e.g., input power) is limited, as is the case with the loop current into the power management circuit 222, and the demand on the output is higher than the input power, as is the case with the electrical storage device 226, a conventional voltage converter configuration may transfer too much power to the output thereby reducing the voltage at the input.

The second voltage converter 244, therefore, can be configured as a power converter to sense and control the insertion voltage at the input 230 and to balance the insertion power with the power transferred into the electrical storage device 226. In one embodiment, the insertion voltage can be compared with a reference voltage to regulate the insertion voltage. For example, as illustrated in FIG. 3, the amplifier 234 can be in communication with a feedback input FB of the second voltage converter. A reference voltage is shown to be connected to a positive input 238 of the amplifier 234. A variable scalar 242 can be connected to a negative input 236 of the amplifier 234. The insertion voltage can be provided to the amplifier 234 through the scalar and the amplifier 234 can compare it to the reference voltage. The amplifier 234 can provide a control signal to the feedback input FB to regulate the insertion voltage to the reference voltage. It will be appreciated, however, that a power converter can be provided in any of a variety of suitable alternative arrangements to maintain an insertion voltage drop at a particular level.

The power management circuit 222 is therefore configured to control the insertion voltage while allowing full loop current (less the miniscule current consumed by the other circuits) to flow to the electrical storage device 226 (e.g., to power the wireless adapter device 220). Accordingly, the second voltage converter 244 can overcome some of the shortcomings of using a conventional current shunt to regulate the insertion voltage. For example, the insertion power (less the miniscule power consumed by the other circuits) generated from the insertion voltage and the loop current can be delivered to the electrical storage device 226. When the loop current changes (e.g., when a control process variable changes), the change in power is transmitted to the electrical storage device 226 via the second voltage converter 244 (e.g., the power management circuit 222 can track and adapt in real-time).

It will be appreciated that the power management circuit 222 can be configured as an "Energy Pump" circuit which converts the insertion voltage to a higher voltage and can also charge the electrical storage device 226 to a higher voltage. Since the precise amount of energy transfer is monitored and compared against a reference voltage (e.g., by the amplifier 234) the insertion voltage can be precise (DC voltage) and stable (AC noise) during the operation of the field device 202. It will also be appreciated that the power extracted from the insertion voltage can be regulated to maintain the loop insertion voltage at a constant value.

The variable scalar 242 can vary the voltage provided to the negative input 236 of the amplifier 234 to facilitate selective control of the insertion voltage. By controlling the insertion voltage, the power provided to the electrical storage device 226 can change when the loop current changes (e.g., when the process variable changes). For example, when the loop current increases, the insertion voltage can be increased to increase the insertion power provided to the electrical storage device 226. By increasing the insertion power, the electrical storage device 226 can be charged quickly thereby increasing the power available from the electrical storage device 226 for operating the wireless communication device 224.

The variable scalar 242 can therefore be controlled to maximize the insertion power provided to the electrical storage device 226. In one example, for a field device (e.g., 202) that is configured to operate at a 1 Volt DC ("VDC") insertion voltage and at a minimum of 3.5 mA, the power management circuit 222 can provide more power to the electrical storage device than would be available from a conventional current shunting system (e.g., 3.5 mW). If the loop current increases to 20 mA, the power management circuit 222 can generate 20 mW of insertion power, without the variable scalar 242 changing the 1 VDC insertion voltage. However, if the variable scalar varies the insertion voltage to about 2.5 VDC, then the power management circuit 222 can generate about 50 mW of insertion power which, in some instances, is enough to power the wireless communication device 224 directly (e.g., without first charging the electrical storage device 226). It will be appreciated that a power management circuit can be configured to handle any of a variety of insertion voltages (e.g., 0.5 VDC, over 2.5 VDC).

In one embodiment, as illustrated in FIG. 3, the power management circuit 222 can include a microcontroller 247 coupled with the variable scalar 242. In one embodiment, the microcontroller 247 can control the variable scalar 242 based upon a predefined setpoint. In another embodiment, the microcontroller 247 can control the variable scalar 242 dynamically (e.g., according to an algorithm). It will be appreciated that the microcontroller 247 can include a microprocessor, an arithmetic logic unit, or any of a variety of other suitable electronic components. However, any of a variety of additional or alternative components can facilitate control of the variable scalar 242. It will be appreciated that the setpoint can be configured at time of installation, or can be dynamically configured such as with the microcontroller 247 or across a wireless communication network by a host system as required or desired.

It will be appreciated that the insertion voltage drop induced by the flow of current through the power management circuit can provide an additional voltage drop to the process control system 200. When the wireless adapter device 220 is connected between nodes L1P and L1N, the magnitude of the insertion drop voltage should be such, that when the insertion drop voltage is combined with the other voltage losses in the process control system 200, the power supply voltage is not exceeded. For example, the combined voltage losses across the loop wires 208a, 208b, 210a, 210b, the wireless adapter device 220, the field device 202, and the current sense resistor 218 should be maintained at or below the power supply voltage.

It will be appreciated that the power supply voltage and corresponding voltage losses can vary for different process control system configurations. Conventionally, the insertion voltage drop on a power management circuit is permanently set at a low level (e.g., about 1 VDC) in order to ensure compatibility with various process control system configurations. However, if these conventional power management circuits are provided on a process control system with low cumulative voltage losses, insertion power can be lost. For example, if the power supply 214 can supply about a 5 VDC voltage, and the combined voltage losses of a process control system (ignoring the insertion voltage drop) total about 2 VDC, the process control system can accept an insertion voltage drop of up to about 3 VDC. However, if the insertion voltage drop of the conventional power management circuit has been set at about 1 VDC, the insertion power will be comparatively less than a conventional management circuit having an insertion voltage drop of about 3 VDC. Therefore, the power management circuit 222 can be configured to control the insertion voltage drop (e.g., stabilize, regulate) to maximize the insertion power for any of a variety of process control system configurations.

It will be appreciated that as the electrical storage device 226 reaches maximum capacity, the voltage across the electrical storage device 226 can rise above proper operating limits. Rather than shunting current and power away from the power management circuit 222 (e.g., with a current shunt), a voltage shunting circuit can be provided in communication with the electrical storage device 226. The voltage shunting circuit can be configured to prevent an overvoltage condition within the electrical storage device 226. In one embodiment, as illustrated in FIG. 3, a voltage shunt 246 can be provided in parallel with the electrical storage device 226, such that as the electrical storage device 226 reaches capacity, the voltage shunt 246 can bypass current and power to prevent the voltage across the electrical storage device 226 from further increasing. In such an embodiment, the power delivered from the output 232 of the voltage converter 228 (less the miniscule power consumed by the other circuits) can be shunted by the voltage shunt 246 to balance the power and regulate the voltage across the electrical storage device 226. As power is delivered from the electrical storage device 226 to the wireless communication device 224, the voltage shunt 246 can cease shunting until the electrical storage device 226 is at capacity again.

It will be appreciated to power various components of the power management circuit 222, a stable voltage can be provided from the insertion voltage drop. In one embodiment, as illustrated in FIG. 3, a voltage converter 252 can be provided to create a constant regulated control voltage to power certain electronic components of FIG. 3.

The power management circuit 222 can provide fast deployment that allows the application of loop currents in excess of the loop current normal operating ranges (e.g., about 3.5-20 mA, up to about 130 mA). This fast deployment can allow a user installing wireless adapter device 220 to rapidly charge the electrical storage device to provide minimal delay after installation to power the wireless communication device 224. To facilitate this fast deployment, the power management circuit 222 includes a fast deployment circuit configured to sense a magnitude of the loop current, and when the magnitude of the loop current reaches a threshold value, maintain the voltage level at the input at an elevated level to facilitate a substantial increase in the charging power delivered to the electrical storage device. In one embodiment, the power management circuit 222 can include a sense resistor 248 and a loop current amplifier 250. The microcontroller 247 can monitor the loop current across the sense resistor 248 and compare it with a threshold value. When the magnitude of the loop current exceeds the threshold value, the microcontroller 247 can define a setpoint for maximum insertion voltage with using the variable scalar 242, and the power management circuit can then receive maximum insertion power. In one embodiment, the microcontroller can compare the loop current against a threshold value of 25 mA. When the loop current exceeds 25 mA for a period of time the variable scalar 242 can be set to provide a maximum insertion voltage drop.

The power management circuit 222 can include overcurrent protection. This over current protection can limit the amount of insertion power when an excessive amount of loop current is being provided to the power management circuit. To facilitate over-current protection the power management circuit 222 can include an over current protection circuit configured to sense the magnitude of the loop current and, when the magnitude of the loop current reaches an over-current threshold value, disable the power regulator. In one embodiment, over current protection circuit can include the sense resistor 248 and the loop current amplifier 250. The positive input and negative input of the loop current amplifier 250 can be electrically connected on opposite sides of the sense resistor 248 to monitor the magnitude of the loop current. If the loop current exceeds a maximum threshold, the output of the loop current amplifier can provide a signal to shut down the power regulator thereby limiting the insertion power provided to the power management circuit 222. In one embodiment, the loop current amplifier 250 can compare the loop current against about a 130 mA threshold. When the loop current exceeds 130 mA, the loop current amplifier 250 can provide a signal to shut down the power regulator.

The power management circuit 222 can include a power save capability. The power management circuit 222 can monitor the loop current (e.g., through sense resistor 248). If the magnitude of the loop current is reduced to a negligible amount, the power management circuit 222 can power down all significant power consuming circuits to preserve the power stored in the electrical storage device. When the loop current regains a particular magnitude (e.g., greater than a negligible amount), the power management circuit 222 can return power to the circuits that were previously shut down. If a process control system has a power outage, this function can help ensure that the wireless adapter device 220 will be immediately available with the electrical storage device at capacity when power returns. If a user has pre-charged the wireless adapter device 220 (e.g., in a lab), this feature can ensure that the wireless adapter device 220 will be fully powered and immediately available to begin radio communications when it is installed on a process control system.

The power management circuit 222 can include an instant-on function, whereby an auxiliary power is established to power the internal control circuitry before the electrical storage device charges up.

The power management circuit 222 can include dynamic radio duty cycle management. In particular, the power management circuit 222 can inform a wireless communication network of the insertion power available to power the wireless communication device 224. Accordingly, the wireless communication network can dynamically configure a maximum radio duty cycle to match the insertion power available to power the wireless communication device 224. When the insertion power is elevated, a duty cycle can be increased to achieve faster update rates for changing process variables. However, when the insertion power is depleted, the duty cycle can be reduced to ensure that the power demand by the wireless communication network does not exhaust the storage capacity of the electrical storage device thereby causing an ultimately loss of radio communication until the electrical storage device can be recharged.

What has been described above includes illustrative examples of certain components and methods. It is, of course, not possible to describe every conceivable combination of components or methodologies, but one of ordinary skill in the art will recognize that many further combinations and permutations are possible.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the examples provided. In addition, while a particular feature may have been disclosed with respect to only one of several implementations, such feature may be combined with one or more other features of the other implementations as may be desired or advantageous for any given or particular application.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A method for managing power for a wireless communication device, the method comprising:
   receiving a loop current at an insertion voltage at an initial input, the loop current being generated by a power supply;
   comparing a reference voltage to a variable scalar;
   generating a feedback signal based at least upon the comparison of the reference voltage to the variable scalar;
   regulating the insertion voltage based at least upon the feedback signal;
   controlling the variable scalar such that an insertion power provided to an electrical storage element changes based on the loop current;
   comparing the loop current with a threshold value;
   in response to a magnitude of the loop current exceeding the threshold value, defining a setpoint for maximum insertion voltage based on the variable scalar;
   delivering charging power to the electrical storage element, wherein if the magnitude of the loop current exceeds the threshold value, then a fast deployment is provided that allows for the loop current to exceed a normal operating range such that the charging power delivered to the electrical storage element is increased, thereby decreasing an amount of time required to charge the electrical storage element; and
   storing the charging power in the electrical storage element.

2. The method of claim 1 wherein the electrical storage element is selected from a group consisting of at least one of a capacitor and a battery.

3. The method of claim 1 further comprising regulating the charging power that is delivered from the electrical storage element to the wireless communication device.

4. The method of claim 1 further comprising preventing an overvoltage condition by shunting the electrical storage element.

5. The method of claim 1 further comprising:
detecting the loop current; and
disabling a power regulator when the loop current exceeds the threshold.

6. The method of claim 1 further comprising controlling the variable scalar with a microprocessor.

7. The method of claim 1 wherein the electrical storage element comprises at least one of a capacitor and a battery.

8. The method of claim 1 further comprising communicating process control variable information from the wireless communication device to a gateway.

9. The method of claim 8 further comprising communicating process control variable information via a Highway Addressable Remote Transducer ("HART") protocol.

10. The method of claim 1 further comprising regulating the insertion voltage to at least about 0.5 Volts Direct Current ("VDC").

11. The method of claim 1 further comprising regulating the insertion voltage to between about 1 Volts Direct Current ("VDC") and about 2.5 VDC.

12. The method of claim 1 further comprising charging a wireless communication device with charging power from the electrical storage device.

13. A method for managing power for a wireless communication device, the method comprising:
receiving a loop current at an insertion voltage at an initial input, the loop current being generated by a power supply;
a step for comparing a reference voltage to a variable scalar;
a step for generating a feedback signal based at least upon the comparison of the reference voltage to the variable scalar;
a step for regulating the insertion voltage based at least upon the feedback signal;
controlling the variable scalar such that an insertion power provided to an electrical storage element changes based on the loop current;
comparing the loop current with a threshold value;
in response to a magnitude of the loop current exceeding the threshold value, defining a setpoint for maximum insertion voltage based on the variable scalar;
delivering charging power to an electrical storage element, wherein if the magnitude of the loop current exceeds the threshold value, then a fast deployment is provided that allows for the loop current to exceed a normal operating range such that the charging power delivered to the electrical storage element is increased, thereby decreasing an amount of time required to charge the electrical storage element; and
storing the charging power in the electrical storage element.

14. The method of claim 13 further comprising:
detecting the loop current; and
disabling a power regulator when the loop current exceeds the threshold.

15. The method of claim 13 further comprising controlling the variable scalar with a microprocessor.

* * * * *